United States Patent Office 3,824,216
Patented July 16, 1974

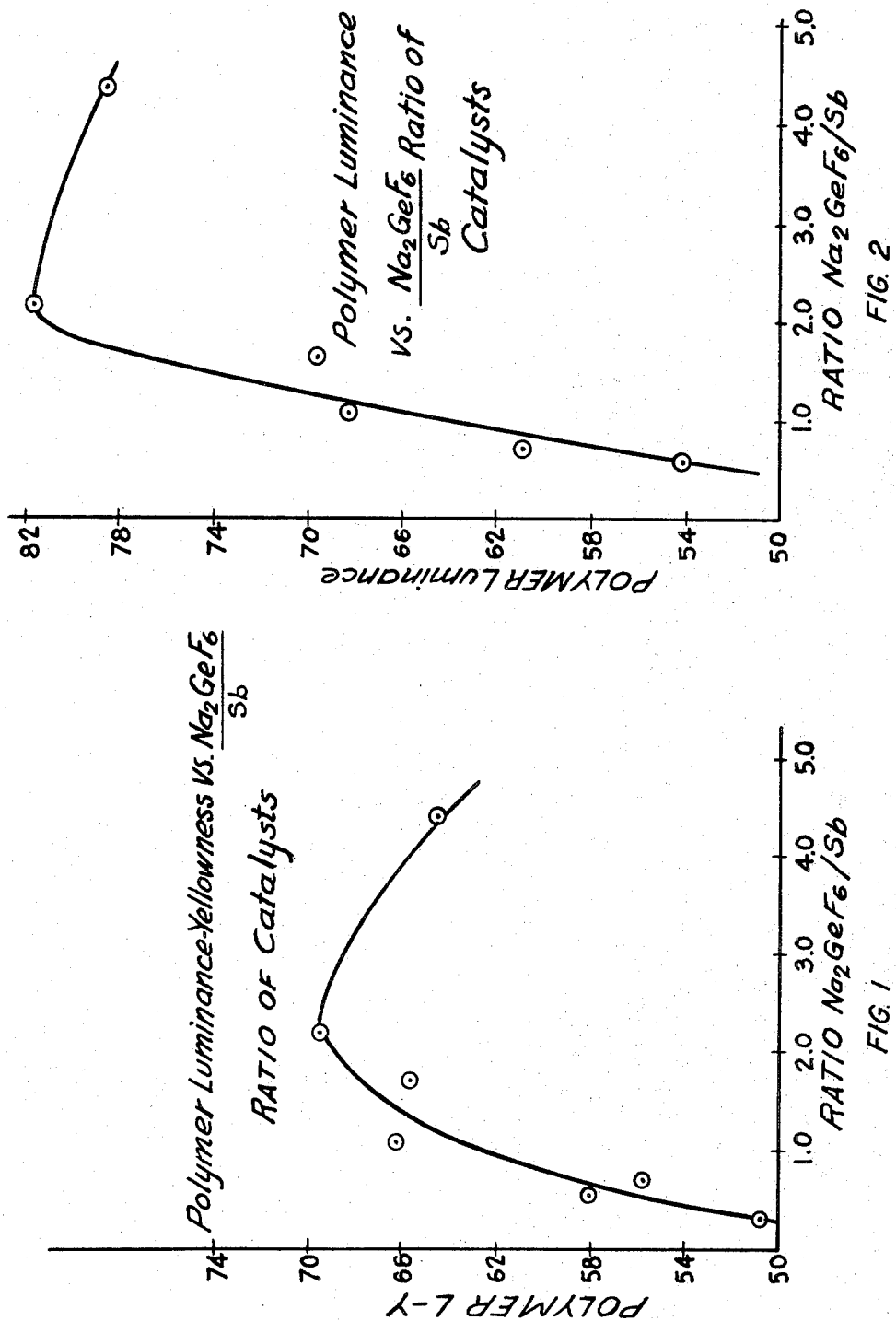

3,824,216
POLYMER CATALYST
Jack Ernest Schweitzer, 2 Sinclair St.,
Kingston, Ontario, Canada
Filed May 8, 1972, Ser. No. 251,120
Int. Cl. C08g 17/015
U.S. Cl. 260—75 R                  12 Claims

ABSTRACT OF THE DISCLOSURE

A process for manufacturing a linear fibre- and film-forming polyester which comprises reacting a diol with a dicarboxylic acid or an ester-forming derivative thereof and polycondensing the resulting dicarboxylate in the presence of a polycondensation catalytic material selected from alkali metal hexafluorogermanates, alkaline earth metal hexafluorogermanates, mixtures of alkali metal hexafluorogermanates with antimony and mixtures of an alkaline earth metal hexafluorogermanate with antimony.

The present invention relates to the manufacture of polyesters, particularly highly polymeric polyethylene terephthalate.

A large number and variety of catalysts have heretofore been proposed for the manufacture of fibre- and film-forming linear condensation type polyesters both for the initial ester-interchange between diol and dicarboxylic acid ester and the later polycondensation stages which take place in the manufacture of these polyesters on a commercial scale. Since the advent of continuous polymerization technology the ester-interchange stage can be dispensed with, the dial being reacted with the diacid as such.

Among the many catalysts previously proposed, there are included, alone or in combination, germanium, germanium compounds and antimony as catalysts for the polycondensation stage. For example, in British Patent Specification No. 1,100,753 published Feb. 13, 1964 in the name of Bayer AG, there is disclosed the use of germanium dioxide and antimony triphenyl as polycondensation catalysts. Canadian Pat. No. 865,219 granted Mar. 2, 1971 to Gavaert-AGFA N.V. discloses the similar use of crystalline germanates which are substantially free from chlorine and may be represented by the formula MeH$_3$Ge$_2$O$_6$, wherein Me represents an alkali metal atom or an ammonium group. Canadian Pat. No. 816,769 granted July 1, 1969 to Farbwerke Hoechst AG describes the similar use of alkali metal germanates, alkaline earth metal germanates, other metal germanates, alkali metal glycol germanates, alkaline earth metal glycol germanates and other metal glycol germanates. Finally, in Imperial Chemical Industries Limited's Canadian Pat. No. 574,148 granted Apr. 14, 1959, there is disclosed the separate catalytic use of antimony compounds, e.g. antimony oxide and antimony trifluoride, with germanium compounds such as germanium dioxide.

Each of the above catalysts has been used in the attempts to produce nearly or completely colourless film- and fibre-forming linear polyesters. However, as the catalysts must be capable of producing polymers of good colour and also accelerate the polycondensation reaction to as great a degree as possible, the choice of catalysts is determined relative to these two requirements. Thus as has been the case with the above prior art polymers, the resulting compromise has generally resulted in a sacrifice of one of these requirements.

It is the primary object of this invention to provide novel polycondensation catalytic material which minimizes the aforesaid sacrifice to a very substantial extent. Additional objects of the invention will appear hereinafter.

According to the present invention, a new process for manufacturing a linear fibre- and film-forming polyester comprises reacting a diol with a dicarboxylic acid or an ester-forming derivative thereof and polycondensing the resulting dicarboxylate in the presence of a catalytic material selected from alkali metal hexafluorogermanates, alkaline earth metal hexafluorogermanates, mixtures of alkali metal hexafluorogermanates with antimony and mixtures of alkaline earth metal hexafluorogermanates with antimony.

The alkali metal of the hexafluorogermanates is preferably sodium or potassium but lithium, rubidium or cesium may be used. The preferred alkaline earth metal of the hexafluorogermanates is calcium but beryllium, magnesium, strontium or barium may be used.

As ester-forming derivatives of dicarboxylic acids leading to linear polyester according to the present invention, there may be used the esters of numerous dicarboxylic acids with low molecular weight aliphatic alcohols containing advantageously from 1 to 4 carbon atoms. Generally, the methyl esters are used.

As dicarboxylic acid, as such or in its ester-interchangeable form, it is particularly advantageous to use terephthalic acid although adipic acid, sebacic acid, isophthalic acid, 4,4'-diphenyldicarboxylic acid, sulphonyl-4,4'-dibenzoic acid, 2,6-naphthalenedicarboxylic acid, 1,2-cyclobutanedicarboxylic acid and 2,5-thiophenedicarboxylic acid can also be used.

There may be employed as diols those with from 2 to 8 carbon atoms, for example, ethylene glycol, 1,4-butylene glycol, 2,2-dimethylpropanediol-1,3, diethylene glycol, 1,2- and 1,3-cyclobutanediol, 1,4-dimethylol-cyclohexane, m- and p-xylylene glycol.

Instead of one dicarboxylic acid or ester thereof and one diol, it is also possible to use several dicarboxylic acids or esters thereof and/or several diols as starting substances. Hydroxycarboxylic acids or hydroxycarboxylic acid esters, for example p-hydroxybenzoic acid methyl ester may also be added to the starting reaction mixture. In this manner copolyesters with specific properties can be obtained.

In a preferred embodiment of the process of the invention, dimethyl terephthalate is reacted with ethylene glycol and the resulting hydroxyethyl terephthalate is polycondensed in the presence of a catalytic material selected from sodium hexafluorogermanate (Na$_2$GeF$_6$) and mixtures of sodium hexafluorogermanate with antimony (Sb). The antimony is preferably added as an oxide or as a soluble glycoloxide.

Preferably, from 0.02 to 0.10% by weight of Na$_2$GeF$_6$ and more preferably from 0.033 to 0.044% by weight of Na$_2$GeF$_6$, based on the weight of dimethyl terephthalate, is used when the polycondensation catalyst is Na$_2$GeF$_6$ alone. If the polycondensation catalyst is Na$_2$GeF$_6$ admixed with Sb, the ratio of Na$_2$GeF$_6$ to Sb is preferably from 0.55 to 4.4, and, more preferably, from 1.1 to 3.3. The Sb content in both ranges may not exceed 0.02% by weight of antimony, based on the weight of dimethyl terephthalate.

In the accompanying drawings which are used to illustrate the ratio of sodium hexafluorogermanate to antimony in one of the preferred catalytic materials of the present invention.

FIG. 1 is a linear plot of the difference between polymer luminance and yellowness values, L–Y versus the ratio of sodium hexafluorogermanate to antimony in the catalytic materials used to prepare the polymers; and FIG. 2 is a linear plot of polymer luminance values, L versus the ratio of sodium hexafluorogermanate to antimony in the catalytic materials used to prepare the polymers.

Referring to FIGS. 1 and 2, it can be seen that polymers made with a mixed catalyst having a $Na_2GeF_6$ to Sb ratio of 0.55 to 4.4 exhibit good colour and the best results are obtained when the ratio of $Na_2GeF_6$ to Sb is in the range 1.1 to 3.3.

An ester-interchange catalyst may also be employed in the process of this invention. This catalyst may be selected from any of the conventional ester-interchange catalysts such as, for example, zinc acetate dihydrate and the acetate of manganese, cobalt, magnesium and calcium. Preferably, the catalyst used does not affect the color of the polymer. It is added to the melt in conventional quantities prior to the ester interchange reaction.

The polycondensation catalytic material used in the process of this invention may be added prior to or subsequent to the ester interchange reaction.

The use of the polycondensation catalytic material of the present invention results in polyesters which exhibit a marked improvement in polymer colour over polyesters obtained using other germanium and/or antimony compounds as disclosed in the prior art. Fibers spun from polymers produced by the present process exhibit high luminosity and low yellowness. Woven fabrics made from these fibers have excellent base whiteness.

The advantages seen in the polycondensation catalytic material of this invention are probably derived from the solubility of this material in the reaction melt.

The preferred polycondensation catalytic material, sodium hexafluorogermanate, when used alone or in combination with small amounts of antimony, yields a polymer which does not have the grayness of antimony catalyzed polymer.

The polymerization process of this invention may be performed as a batch or continuous process and each is carried out in a conventional manner.

Certain compounds may be added to the reaction melt to attain desired effects. For instance, stabilising agents such as phosphorus compounds, delustering agents, optical brighteners or colouring agents may be added.

The following Examples are used to illustrate preferred embodiments of the process of this invention and to compare the process of this invention with polycondensation processes proposed previously.

In the Examples, the term "intrinsic viscosity" means the reduced viscosity of the polymer at zero concentration which may be determined by measuring the flow times of a polymer solution after successive dilutions with fresh solvent, calculating the reduced viscosities, and extrapolating a plot of the reduced viscosity against concentration to zero concentration. The reduced viscosity is obtained from the expression $$\left(\frac{\text{Flow time of polymer solution}}{\text{Flow time of solvent}} - 1\right) \times \frac{1}{c}$$

where $c$ is the concentration expressed as grams of polymer per 100 ml. of solvent. As used herein, the intrinsic viscosity was measured at 25° C. using orthochlorophenol as a solvent in a modified Ostwald viscometer.

In the Examples, polymer colours were determined by measurement of the reflectance of the polyester in the form of a ribbon on a "Colormaster" which is the trademark for the differential colorimeter manufactured by the Manufacturers Engineering and Equipment Corporation. From these measurements it was possible to compare the yellowness and luminance values (referred to as Y and L, respectively, in these measurements) of polyesters prepared using various catalyst systems. Luminance (Y on the Commission Internationale de L'Eclairage system) is a measure of the proportion of the incident light reflected and yellowness, is a measure, based on C.I.E. chromaticity coordinates, of the separation of the points representing the colour rating of the polymer from the point representing standard illuminant "C," positive values being measured in the direction of a dominant wave-length of 580–590 m$\mu$ and negative values in the direction of a dominant wave-length of 470–490 m$\mu$.

A useful criterion of colour is obtained by subtracting the yellowness value from that of the luminance. The best colour is obtained when the luminance value minus the yellowness value is at a maximum. To determine yarn colour, a pad of yarn was made by winding yarn onto a metal plate using a precision winder, then color measurements were carried out as for the polymer.

Fabric colours were measured with a Hunterlab D40 (Registered Trademark) reflectometer using a method described by R. S. Hunter published in the Journal of the Optical Society of America, 50, January 1960.

In the Examples, the sodium hexafluorogermanate used was a white finely divided powder. The powder was slurried in glycol, heated to facilitate solution and then added to the melt as described in the Examples. In all the Examples, antimony was added as a solution of antimony triglycoloxide in ethylene glycol. The antimony triglycoloxide was prepared by reacting a known amount of antimony trioxide with ethylene glycol at an elevated temperature and under reduced pressure and removing water formed during the reaction.

All catalyst quantities in the Examples were calculated as percentages by weight based on the weight of dimethyl terephthalate used. All parts were calculated by weight unless otherwise indicated.

EXAMPLE 1

A mixture composed of 100 parts of dimethyl terephthalate, 72 parts of ethylene glycol and 0.017 part of zinc acetate dihydrate was heated in an atmosphere of nitrogen with agitation to a temperature within the range of from 150 to 215° C. during the course of 3 hours, during which time the theoretical amount of methanol was distilled off. After the addition of 0.5 part of $TiO_2$, used as a delustrant, and 0.038 part of antimony, added as an antimony glycoloxide solution in ethylene glycol, the tempearture was raised to 225° C. and excess glycol was removed. The pressure was then decreased to approximately 0.5 mm. Hg while the temperature was raised simultaneously to 280° C. during the course of about forty-five minutes. The melt was stirred under these conditions for approximately one hour until the power consumed by the agitator indicated a suitable molecular weight had been achieved. Nitrogen was introduced into the reaction vessel until the pressure was slightly less than atmospheric pressure at which time 0.04 part of triphenyl phosphite was added and stirred into the melt for 5 minutes. The pressure was reduced again to approximately 0.5 mm. Hg and the polymerization continued until the power consumed by the agitator indicated the desired molecular weight had been attained. The melt was discharged into water. The polymer made by this process had a grayish cast, an intrinsic viscosity of .640 and a softening point of 260° C. The polymerization reaction time was 108 minutes.

EXAMPLES 2 TO 12

Polymer samples were made using the procedure described in Example 1, except that a different polymerization catalytic material was used. The particular catalytic material and amount used thereof in each Example are listed in Table I. Sodium hexafluorogermanate dissolved in warm ethylene glycol was added to the monomer melt at the normal point of addition as described in Example 1. In Examples 11 and 12, which have been included for purposes of comparison, the germanium dioxide was added in a similar manner as the sodium hexafluorogermanate except that not all the germanium dioxide dissolved in the glycol and care was taken to wash all the catalyst into the melt with a small glycol wash. The results of Examples 2 to 12 are set out in Table I.

TABLE I

| | Catalyst | Percent of catalyst | Polymerization time, minutes | Polymer I.V. | Softening point, °C. |
|---|---|---|---|---|---|
| Example: | | | | | |
| 2 | Na₂GeF₆ | 0.044 | 98 | 0.643 | 259.5 |
| 3 | Na₂GeF₆ | 0.033 | 115 | 0.665 | 258.9 |
| 4 | Na₂GeF₆/Sb | 0.022/0.02 | 102 | 0.649 | 261.4 |
| 5 | Na₂GeF₆/Sb | 0.022/0.01 | 111 | 0.660 | 258.2 |
| 6 | Na₂GeF₆/Sb | 0.011/0.02 | 135 | 0.669 | 261.4 |
| 7 | Na₂GeF₆/Sb | 0.033/0.02 | 125 | 0.669 | 260.6 |
| 8 | Na₂GeF₆/Sb | 0.022/0.03 | 117 | 0.668 | 260.3 |
| 9 | Na₂GeF₆/Sb | 0.011/0.03 | 112 | 0.665 | 260.9 |
| 10 | Na₂GeF₆/Sb | 0.044/0.01 | 101 | 0.616 | 260.5 |
| 11 | GeO₂ | 0.02 | 203 | 0.624 | 258.5 |
| 12* | GeO₂/Sb | 0.01/0.02 | 108 | 0.681 | 258.4 |

* 0.01% GeO₂ is equivalent to 0.022% Na₂GeF₆ in germanium content.

The polymers of Examples 1 to 5 and 12 were spun on a conventional spinning machine and drawn on a heated feed roll drawtwister to produce 30/10 D yarn. The yarn was knitted to make a marquisette fabric for colour measurements.

Table II sets out the colours of the polymer, and some of the yarn and fabric colours of Examples 1 to 12.

TABLE II

| | Catalyst | Polymer colour | | | Yarn colour | | | Fabric colour | | |
|---|---|---|---|---|---|---|---|---|---|---|
| | | L | Y | L-Y | L | Y | L-Y | Luminosity | Yellowness | Whiteness |
| Example: | | | | | | | | | | |
| 1 | Sb | 58.9 | 2 | 56.9 | 78.6 | 18 | 60.6 | 77.9 | 3.3 | 64.8 |
| 2 | Na₂GeF | 82.3 | 10 | 72.3 | 84.9 | 15 | 69.9 | 88.0 | 5.3 | 66.8 |
| 3 | Na₂GeF | 82.9 | 13 | 69.9 | 81.8 | 17 | 64.8 | 84.6 | 3.8 | 69.2 |
| 4 | Na₂GeF/Sb | 68.3 | 2 | 66.3 | 83.9 | 1 | 82.9 | 88.7 | 4.1 | 72.4 |
| 5 | Na₂GeF/Sb | 81.6 | 12 | 69.6 | 86.1 | 21 | 65.1 | 85.8 | 3.8 | 70.5 |
| 6 | Na₂GeF/Sb | 54.1 | -5 | 59.1 | | | | | | |
| 7 | Na₂GeF/Sb | 69.7 | 4 | 65.7 | | | | | | |
| 8 | Na₂GeF/Sb | 60.8 | 5 | 55.8 | | | | | | |
| 9 | Na₂GeF/Sb | 69.8 | 19 | 50.8 | | | | | | |
| 10 | Na₂GeF/Sb | 78.5 | 14 | 64.5 | | | | | | |
| 11 | GeO₂ | 80.8 | 21 | 59.8 | | | | | | |
| 12 | GeO₂/Sb | 77.7 | 15 | 62.7 | 81.6 | 31 | 50.6 | 84.4 | 6.3 | 59.1 |

As can be seen from the results in Table II, the polymers obtained using the catalytic material of the present invention exhibit higher luminance and higher L–Y values than polymers obtained using only an antimony catalyst.

The polymers obtained by the process of the present invention are most advantageously used for making fibers, filaments, and films of which clarity and a high degree of whiteness are required.

The embodiments of the invention in which an exclusive property or privilege is claimed are defined as follows:

1. A process for manufacturing a linear fibre- and film-forming polyester which comprises reacting a diol with a dicarboxylic acid or an ester-forming derivative thereof and polycondensing the resulting dicarboxylate in the presence of a catalytic amount of a polycondensation catalytic material selected from alkali metal hexafluorogermanates, alkaline earth metal hexafluorogermanates, mixtures of alkali metal hexafluorogermanates with antimony and mixtures of an alkaline earth metal hexafluorogermanate with antimony.

2. A process as claimed in Claim 1 wherein the diol is ethylene glycol and the dicarboxylic acid ester-forming derivative is dimethyl terephthalate.

3. A process as claimed in Claim 2 wherein the polycondensation catalytic material is sodium hexafluorogermanate.

4. A process as claimed in Claim 3 wherein from 0.02 to 0.10% by weight of sodium hexafluorogermanate, based on the weight of dimethyl terephthalate, is used.

5. A process as claimed in Claim 3 wherein from 0.033 to 0.044% by weight of sodium hexafluorogermanate, based on the weight of dimethyl terephthalate, is used.

6. A process as claimed in Claim 2 wherein the polycondensation catalytic material is a mixture of sodium hexafluorogermanate with antimony and the antimony added does not exceed 0.02% by weight, based on the weight of dimethyl terephthalate.

7. A process as claimed in Claim 6 wherein the antimony is added as an oxide.

8. A process as claimed in Claim 6 wherein the antimony is added as a soluble glycoloxide.

9. A process as claimed in Claim 6 wherein the antimony is added as a solution of antimony triglycoloxide in ethylene glycol.

10. A process as claimed in Claim 7 wherein the ratio of sodium hexafluorogermanate to antimony is from 0.55 to 4.4.

11. A process as claimed in Claim 7 wherein the ratio of sodium hexafluorogermanate to antimony is from 1.1 to 3.3.

12. A process as claimed in Claim 2 wherein an ester-interchange catalyst is used to catalyze the ester-interchange reaction.

References Cited

UNITED STATES PATENTS 3,506,618  4/1970  Carter et al.
3,554,978  1/1971  Carter et al.

MELVIN GOLDSTEIN, Primary Examiner